United States Patent
Batabyal (10) Patent No.: US 7,823,125 B2
(45) Date of Patent: Oct. 26, 2010

(54) ELECTRONIC ENABLER AND PRESCRIPTIVE MODULAR SERVICE ORIENTED ARCHITECTURE

(75) Inventor: Ritwik Batabyal, Bangalore (IN)

(73) Assignee: Wipro Limited, Bangalore, Karnataka (IN)

( * ) Notice: Subject to any disclaimer, the term of this patent is extended or adjusted under 35 U.S.C. 154(b) by 989 days.

(21) Appl. No.: 11/467,176

(22) Filed: Aug. 25, 2006

(65) Prior Publication Data

US 2008/0052664 A1 Feb. 28, 2008

(51) Int. Cl.
G06F 9/44 (2006.01)
G06F 9/45 (2006.01)

(52) U.S. Cl. ............... 717/120; 717/102; 717/121

(58) Field of Classification Search ......... 717/100–104, 717/107–108, 120–123
See application file for complete search history.

(56) References Cited

U.S. PATENT DOCUMENTS

| | | | | |
|---|---|---|---|---|
| 6,944,860 B2* | 9/2005 | Schmidt | .................. | 718/100 |
| 6,985,939 B2* | 1/2006 | Fletcher et al. | ............ | 709/223 |
| 7,076,762 B2* | 7/2006 | Fisher | .................. | 717/102 |
| 7,162,719 B2* | 1/2007 | Schmidt | .................. | 718/104 |
| 7,174,363 B1* | 2/2007 | Goldstein et al. | ............ | 709/203 |
| 7,197,740 B2* | 3/2007 | Beringer et al. | ............ | 717/108 |
| 7,213,049 B2* | 5/2007 | Felt et al. | .................. | 709/203 |
| 7,340,714 B2* | 3/2008 | Upton | .................. | 717/102 |
| 7,421,716 B1* | 9/2008 | Margulis et al. | ............ | 719/331 |
| 7,444,433 B2* | 10/2008 | Goldstein et al. | ............ | 709/253 |
| 7,496,887 B2* | 2/2009 | Grasselt et al. | ............ | 717/101 |
| 7,503,031 B2* | 3/2009 | Chang et al. | ............... | 717/101 |
| 7,562,342 B2* | 7/2009 | Berg et al. | .................. | 717/108 |
| 7,584,454 B1* | 9/2009 | Massoudi | .................. | 717/121 |
| 7,685,568 B2* | 3/2010 | Brendle et al. | ............ | 717/120 |
| 7,703,071 B2* | 4/2010 | Kuester et al. | ............ | 717/104 |

OTHER PUBLICATIONS

Salomie et al, "Model and SOA solutions for traceability in logistic chains", ACM iiWAS, pp. 339-344, 2008.*
Hosamani et al, "Monitoring the monitor: an approach towards trustworthiness in service oriented architecture", ACM IW-SOSWE, pp. 42-46, 2007.*
Zdun et al, "Model process driven and service oriented architecture using patterns and patterns primitives", ACM Trans. on the Web, vol. 1, No. 3, article 14, pp. 1-44, 2007.*
Papazoglou et al, "Service oriented architecture: approaches, technologies and research issues", The VLDB Journal, 16, pp. 389-415, 2007.*
Taylor et al, "Charging for information services in service oriented architectures", IEEE, pp. 1-8, 2005.*
Wu et al, "Requirements of federated trust managemnet for service oriented architectures", ACM, pp. 1-12, 2006.*

* cited by examiner

*Primary Examiner*—Anil Khatri
(74) *Attorney, Agent, or Firm*—Prakash Nama; Global IP Services, PLLC (57) ABSTRACT

A system and application design model deploys self-describing modules (e.g., COTS-component off the shelf) of code or services that can be reused on-demand and composed into multiple processes and composite solutions. Also described herein is a method of providing a modular prescriptive architecture for a user of a business process to obtain reusable services which are composed into service oriented multiple processes and composite solutions on a web-application. The prescriptive architecture is SOA oriented and uses a plurality of tiers including a client tier, a presentation tier, a business logic tier, an integration tier, and a data tier, as well as an infrastructure service layer designed across and interacting with the plurality of tiers. Each tier may have further layers. The prescriptive architecture provides data integrity, is scalable, flexible, and extensible, and can be internationalized. A method of designing a software prescriptive architecture is also included.

21 Claims, 5 Drawing Sheets

ELECTRONIC ENABLER AND PRESCRIPTIVE MODULAR SERVICE ORIENTED ARCHITECTURE

FIELD OF THE INVENTION

This invention generally relates to a service-oriented architecture (SOA) in a software project for a user to obtain business process services, and more particularly for a user to obtain services composed into multiple processes and composite solutions.

BACKGROUND OF THE INVENTION

In most software projects, the architecture specification of an enterprise system is captured using informal box and line diagrams with textual annotations. The informal architecture specification is transformed to the stage of implementation through a manual development process where the specification is hypothetically related to the implementation. Such implementation however suffers from people related and project-specific idiosyncrasies leading to ambiguity, misinterpretation and often erroneous implementation. It is noted that Architecture Description Languages (ADL) like C2, Wright, Darwin, Acme and Rapide have become available in the market to give a standard shape to the system architectures. However, though based on formal semantics, the foregoing ADLs have generally failed to capture all the required concepts of enterprise systems.

It is desirable to obviate the disadvantages of the known approach to design an architecture specification through a novel Prescriptive Architecture.

SUMMARY OF THE INVENTION

The present invention generally provides an SOA specification and method for a user to obtain reusable services selectively using formal notation and well defined syntax and semantics. In the "On Demand" era, for the present software project, one of the desirable requirements is to meet changing business requirements with flexibility and speed. The present invention provides e-Enabler Prescriptive Architecture based on the Service Oriented Architectural standard which ensures flexibility and speed in meeting client demand as well as market opportunity while assisting to obviate external threat against security.

The prescriptive architecture is designed considering a set of requirements classified for each of the services which include UI (User Interface), Integration, Security, Data Integrity, Internationalization, Performance and Scalability, Flexibility and Extensibility, Availability and Maintainability. The goals in the present approach are generally set to achieve:

a SOA,
a component based system,
an N-Tiered Architecture, and,
High availability and scalability.

Certain Key architectural principles which guide the present architecture include:

1. Buy instead of build:
   Use proven COTS (Components Off the Shelf)/Open Source® products/frameworks instead of building an equivalent from scratch.
2. Simplicity:
   Keep everything as simple as possible & avoid over-engineering.
3. Use Design Patterns:
   Wherever it is appropriate, apply relevant design patterns.
4. Separation of concerns:
   Expediently, the architecture provides clean separation of work considering the different roles involved in the development process which might use UI designers and component developers.

The invention in one form resides in a modular prescriptive architecture for a user of a business process to obtain reusable services in a system, said reusable services being composed into service oriented multiple processes and composite solutions on web-application, said prescriptive architecture comprising: a plurality of tiers selectively including five tiers, i.e., a client tier; a presentation tier; a business logic tier; an integration tier; a data tier; and an infrastructure service layer designed across and interacting with said plurality of tiers. In one form, the modular prescriptive architecture uses the foregoing five tiers, which may further be subdivided into layers.

The invention is another form resides in a method of providing a modular prescriptive architecture for a user of a business process to obtain reusable services in a system, said reusable services being composed into service oriented multiple processes and composite solutions on web-application, said method comprising the step of using a plurality of tiers selectively including a client tier; a presentation tier; a business logic tier; an integration tier; a data tier; and an infrastructure service layer designed across and interacting with said plurality of tiers.

The invention in yet another form resides in a method of designing a software modular prescriptive architecture to provide on-demand services in a reusable manner for a user through web-access, said services being composed into multiple processes and composite solutions, comprising the steps of: the user entering user requirements into an interface as a web request input to result in deciding an action-class; the action class creating a business request and delegating it to a business logic tier; using a business logic controller to manage request processing, and passing on control to a business process function; using the business process function by orchestrating several functionalities by interaction selectively with databases, data access components and external systems using integration services; and, using infrastructure services to enable and complete user transactions.

BRIEF DESCRIPTION OF THE DRAWING

A more detailed understanding of the invention may be had from the following description of exemplary embodiments, to be understood in conjunction with the accompanying drawing wherein.

DETAILED DESCRIPTION

A detailed description of one or more embodiments of the invention is provided below along with accompanying figures that illustrate by way of example the principles of the invention. While the invention is described in connection with such embodiments, it should be understood that the invention is not limited to any specific embodiment. On the contrary, the scope of the invention is limited only by the appended claims and their equivalents, and the invention encompasses numerous alternatives and modifications. For the purpose of example, numerous specific details are set forth in the following description in order to provide a thorough understanding of the present invention.

The present invention may be practiced according to the claims without some or all of these specific details. For the purpose of clarity, technical material that is known in the technical fields related to the invention has not been described in detail so that the present invention is not unnecessarily obscured.

Described herein are a system, and application design model that implement self-describing modules of code or services that can be reused and composed into multiple processes and composite solutions. Also described herein is a method of providing a modular prescriptive architecture for a user of a business process to obtain reusable services which are composed into service oriented multiple processes and composite solutions on a web-application. The prescriptive architecture is referred to herein as e-Enabler Prescriptive Architecture and generally uses five tiers including a client tier, a presentation tier, a business logic tier, an integration tier, a data tier, and an infrastructure service layer designed across and interacting with said plurality of tiers. Each tier may have further layers. For example, the presentation tier has model, view and controller layers and the business tier has business process and application service layers. The infrastructure services layer is designed across the tiers. The architecture includes a service bus which is an asynchronous-synchronous based communication channel between services and clients designed across tiers too. The integration tier with its solutions is managed by the service bus. This makes the system modular, flexible & extensible, resulting in better re-use of the components at the various layers and achieves the objective of "separation of concerns".

Figure 2:
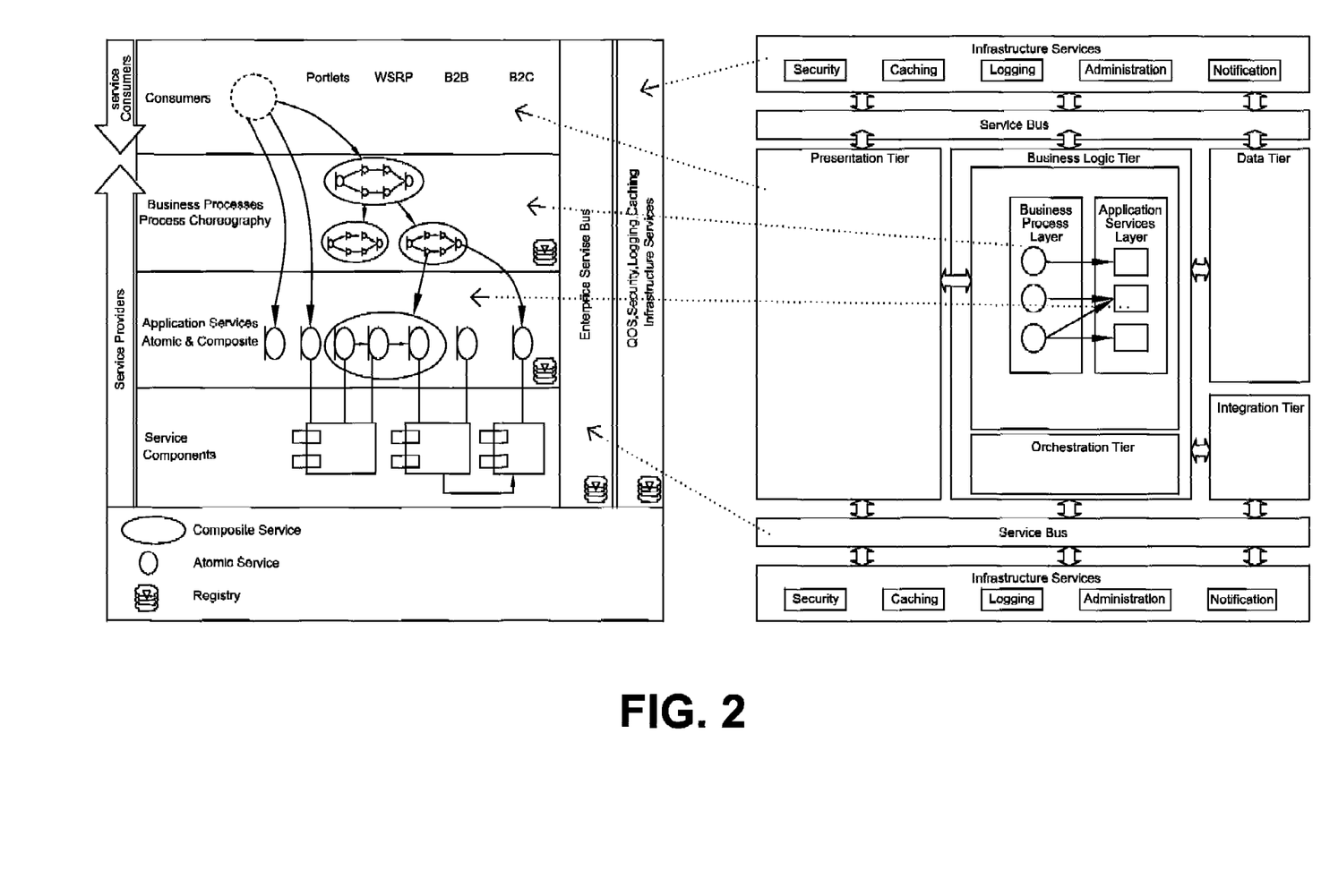
FIG. 2 illustrates a SOA reference view as mapped to an exemplary e-Enabler Prescriptive Architecture.

Adhering to SOA, the Business Process Service, Application Service and Infrastructure Service layers constitute the Service Providers. Service Consumers for example, comprise of the application front-end stereotypes such as Portal, B2C, B2B, and Web Service Remote Portlets. Reference may be had in this context to FIG. 2. With reference to FIG. 2, the layers defined by the SOA reference architecture are uniquely mapped to the layers and tiers of e-Enabler Prescriptive Architecture. For instance, the Portals, B2C or B2B interfaces of presentation-tier constitute examples of the service consumer layer. The Business Process, Application Service and the Infrastructure Services form part of the Service Provider Layer which is used via a communication channel such as the Service Bus.

It is noted that:

e-Enabler Prescriptive Architecture provides a common baseline for various application stereotypes (including B2C, B2B, B2E, Portals) providing the following advantages:
  Flexible 'On-Demand' architecture that helps build applications that are responsive to business needs,
  Well architected applications—Architecture and design that constitute the industry-best practices,
  Reduction in cycle time for application development.

The present Prescriptive Architecture is currently being used for implementations on the following platforms:
  BEA®
  a. Weblogic Application Server
  b. Weblogic Portal
  IBM®
  c. Websphere Application Server
  d. Websphere Portal
  SAP®
  e. Web Application Server
  f. Netweaver Portal
  JBoss® Application Server
  Oracle® Application Server
  ATG® Application Server
  SUN® Application Server.

Figure 1:
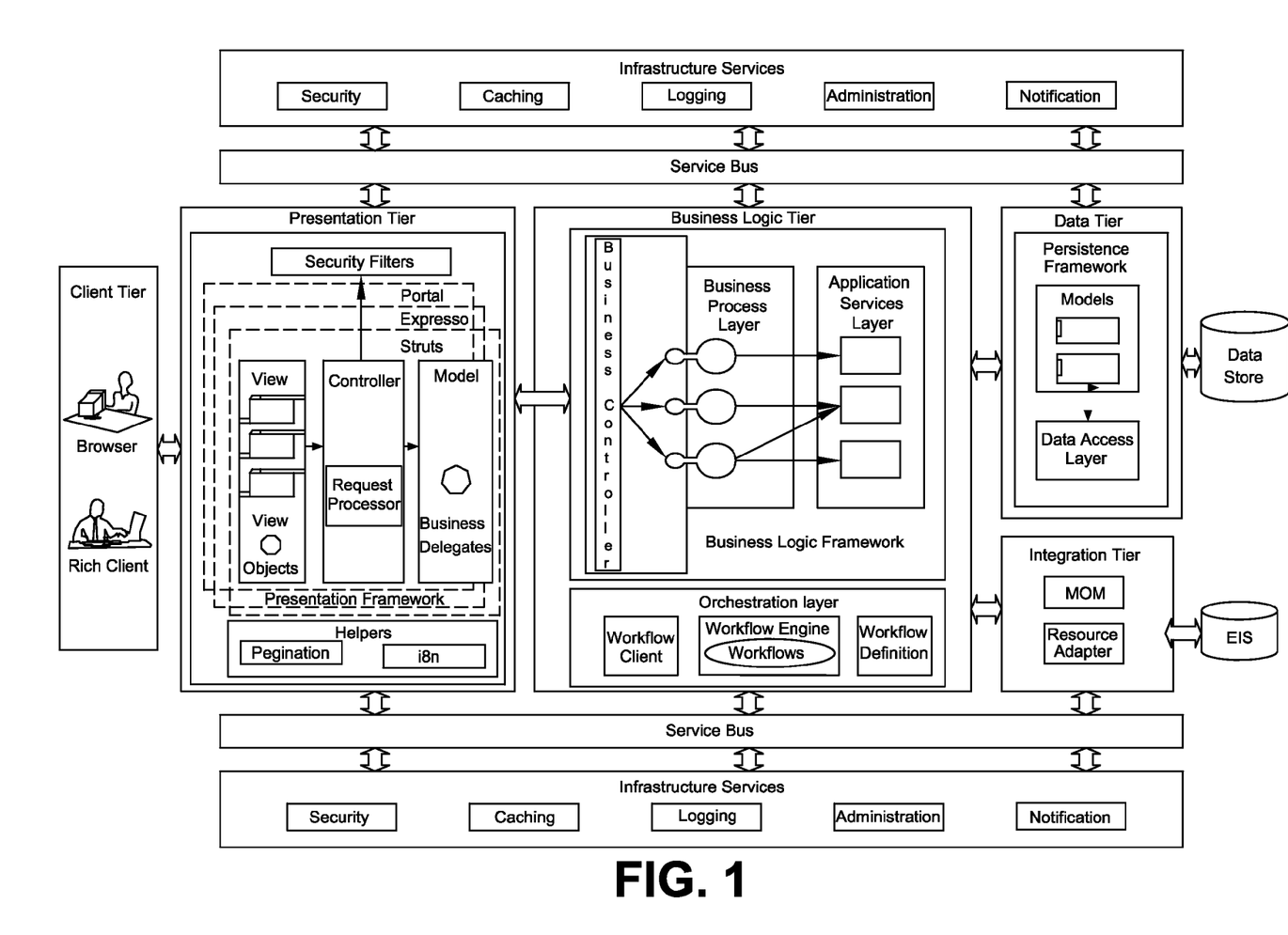
FIG. 1 illustrates an exemplary embodiment of the present e-Enabler Prescriptive Architecture.

With specific reference to FIG. 1, the following is an overview of the functionality of the five tiers and their interaction, in one embodiment of the system:

Web Client Tier: This tier includes the components required by the end-user to interact with the web application using varied inputs.

Presentation Tier: This tier would have the presentation logic for rule based navigation across web pages. The presentation logic would also provide infrastructure service support including security, caching, server side request validation, etc.

The presentation tier for example, may use the following industry best practice design patterns:
  Model-View-Controller,
  Benefits: To decouple business state representation, application management, and presentation,
  Front Controller,
  Benefits: To centralize and manage application request processing, and,
  Business Delegate,
  Benefits: To reduce coupling between Web and EJB tiers as per GRASP patterns,
  Intercepting Filter,
  Benefits: Apply configurable pre & post processing of requests & responses,
  Service Locator, and,
  Benefits: To abstract and encapsulate service lookup details (& provide caching).

The Presentation Tier ensures formation of business requests and receipt of business responses for every transaction and proper delegation of the requests to the business-logic tier via a generic business delegate implementation.

Business Tier

The business requests generated from the Presentation Service layer would be managed by the Business Controller {Business requests are mapped to Business request Handlers which in turn would invoke the business process services (Façades)}.

The Business Logic Tier has layers to capture the application business processes:
  Business Process Layer This layer implements the Session Façade design pattern in order to coordinate operations between multiple business objects. This layer would have the business process services (identified functional services) componentized to have the logical flow of the constituent functional steps that need to be performed to provide a business function.
  Application Services Layer This layer would provide a well-defined application-specific discrete function that can exist independently. The services in this layer would not have any business process knowledge.

They would consist of the logic pertaining to each of the functional steps that constitute the business process.

Data Tier

This tier would have the data access logic to interact with the underlying data stores. This tier would have Data Models which represent the data entities as objects and Data Access layer which would encapsulate the details of connecting the data-models to the underlying data store. This tier would use the DAO (Data Access Object) design pattern to abstract and encapsulate data access mechanisms.

Integration Tier

This tier provides the services needed for the system to interface with external systems. For example, JCA® (Java Connection Architecture) Adaptors and a Message Oriented Middleware may be used in this tier to interface with external systems.

Infrastructure Services Layer

This layer provides the common infrastructure services (non-application specific) which will be used by all the five tiers by invoking them via the Common Invocation Framework. These services are reusable by multiple applications. These services not only are designed as per latest design standards but also are completely configurable.

The infrastructure services include

Security Service,
   Authentication service,
   Authorization service, Logging Service, Notification service, Caching Service, Administration Service, Printing Service, Reporting Service, Business Rule Service, Internationalization Service, User-Messaging Service, and, Metrics Service.

Common Invocation Framework

The Common Invocation Framework or the CIF is a scaled down version of a service bus built as per SOA guidelines of an Enterprise Service Bus and can be used off the shelf from Wipro's (-the assignee-) e-Enabler framework. The CIF facilitates dynamic discovery of services registered on a registry and invokes them by a service broker.

Typical technical requirements based on which the present prescriptive architecture may be designed, for example, include:

UI (User Interface)
   The system has to provide a UI for clients accessing it using the internet.
   The UI provided should allow changes without requiring extensive rework.
   The UI should have a consistent look & feel.
   The system should be able to support multiple delivery channels like PDAs, etc., in the future.
   To use cookies/URL redirection for session management.
   To use JavaScript for client side validation.
   Supporting browsers from multiple vendors and multiple versions of the browsers.

Presentation
   To implement data validations in this tier.
   To maintain the conversational state in this tier.
   To utilize infrastructure capabilities in this tier like caching viewable information, authenticating and authorizing users.

Business Logic
   To provide management of business requests delegated from presentation tier,
   To capture business processes of the system,
   To orchestrate functionalities of a business process, and,
   To utilize infrastructure capabilities like logging, business rules.

Integration
   The system has to interface with Enterprise Information Systems on a real time basis.
   The system has to interface with existing third party systems.
   The system should be able to handle different types of interfaces and multiple transport protocols.
   The system should provide easily configurable routing of messages across systems.
   The system should provide additional message transformation services including compression, filtering, reformatting, etc.

Security
   The system should preferably provide security and control access to functionality based on permissions.
   The system should preferably be able to control access to users based on the data they are trying to access.
   The system preferably has to maintain information on who made changes on important data.
   The system needs to ensure the confidentiality of sensitive data like passwords during transmission.

Data Integrity
   The system should maintain the integrity of the data at all times.

Internationalization
   The system should be able to support users from multiple geographical locations.

Performance & Scalability
   The system has to be able to support several (about 200) concurrent users and be able to support more in the future if needed.
   The average response time for non-search type UI should preferably be less than 5 seconds.

Flexibility & Extensibility
   The system should allow for changes in the business processes and rules without requiring major rework.
   The system should allow for changes in data requirements and representations in the back-end systems without major rework.
   The system should be extensible to accommodate new requirements in the future.

Availability
   The system has to be available 24 hours of the day, all days of the week.

Maintainability

The system should be manageable using standard enterprise management tools.

Figure 3:
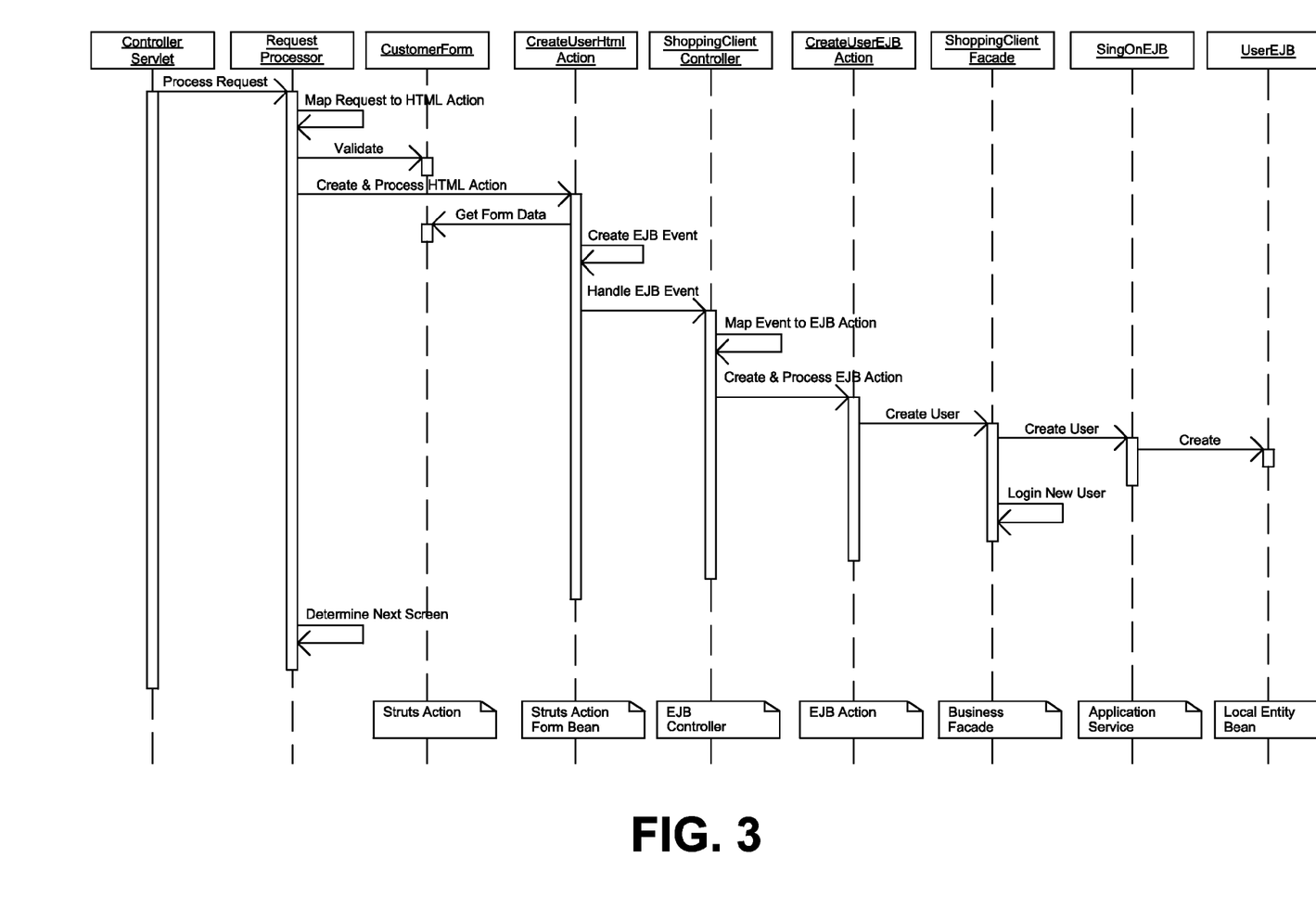
FIG. 3 illustrates an object interaction diagram.

The following is an example of user-initiated interaction with the system with reference to FIG. 3, to use the present Prescriptive Architecture:

The user inputs his requirements on the screen and submits the form. The presentation controller receives the web-request, prepares the information object and processes the request in the 'action class' (web-request handler). The 'action class' marks the end of scope of the web-request.

This 'action class' creates a business request and delegates the same to the business-logic tier in order to get it processed. The transaction returns a business response on its completion. The business delegation is a single point of exit of the presentation tier.

The business logic controller manages the business request processing by invoking relevant request handlers as mapped on a configuration file. This business logic controller is the single point of entry to the business-logic tier. The request-handlers in turn pass the control to the business process.

The business process accomplishes its functioning by orchestrating several functionalities involved in that process. During orchestration, it may interact with databases using data-access components or external information systems using integration services.

The application service layer uses infrastructure services to enterprise-enable its transactions.

It is noted that the illustration in FIG. 3 includes an object interaction diagram. A typical round-trip interaction is captured with general reference to FIG. 3. The screen-to-screen navigation is controlled in the presentation tier by the controller servlet which parses protocol-specific requests and invokes a corresponding request handler. This request handler then forms the business request—CreateUser and delegates the same to the business logic tier. Here the business requests are received by a business logic controller which delegates the request to a corresponding request handler—CreateUserEJBAction. This request handler triggers the relevant business process by invoking the process façade—Shoppingclient Façade. The façade executes the functionality of adding the user and signing him into system by respective enterprise components like SignOnEJB. The transaction on successful return navigates to the next screen.

A service which an industry wishes to obtain from the present Prescriptive Architecture includes the function of logging.

Logging is one of the infrastructure services developed as part of this framework. As with all other infrastructure services, the core functionality of logging infrastructure service is developed as a component.

The logging component includes the following 3 types of interfaces:
Functional Interface,
Management Interface, and,
Factory interface.

The functional interface is the one to be used in an application for the desired logging infrastructure functionality.

The management interface is to be used to manage the component (from a remote console).

The factory interface is to be used for the creation of the components based on any configuration files if needed.

There are multiple implementations of the logging component including for example Log4j based, Jdk1.4 logging based implementations.

Logging service provides the infrastructure functionality as a service to an application (instead of the user having to deal with discrete component instances individually).

The logging service also includes for example the following 3 types of interfaces:
Functional Interface,
Management Interface, and,
Factory Interface.

The service functional interface provides the functional interfaces of the service and pre-configured named components that a particular service instance is configured for.

The service management interface will be used to manage the service.

The service factory interface will be used to create instances of the service using service configuration information.

Figure 4:
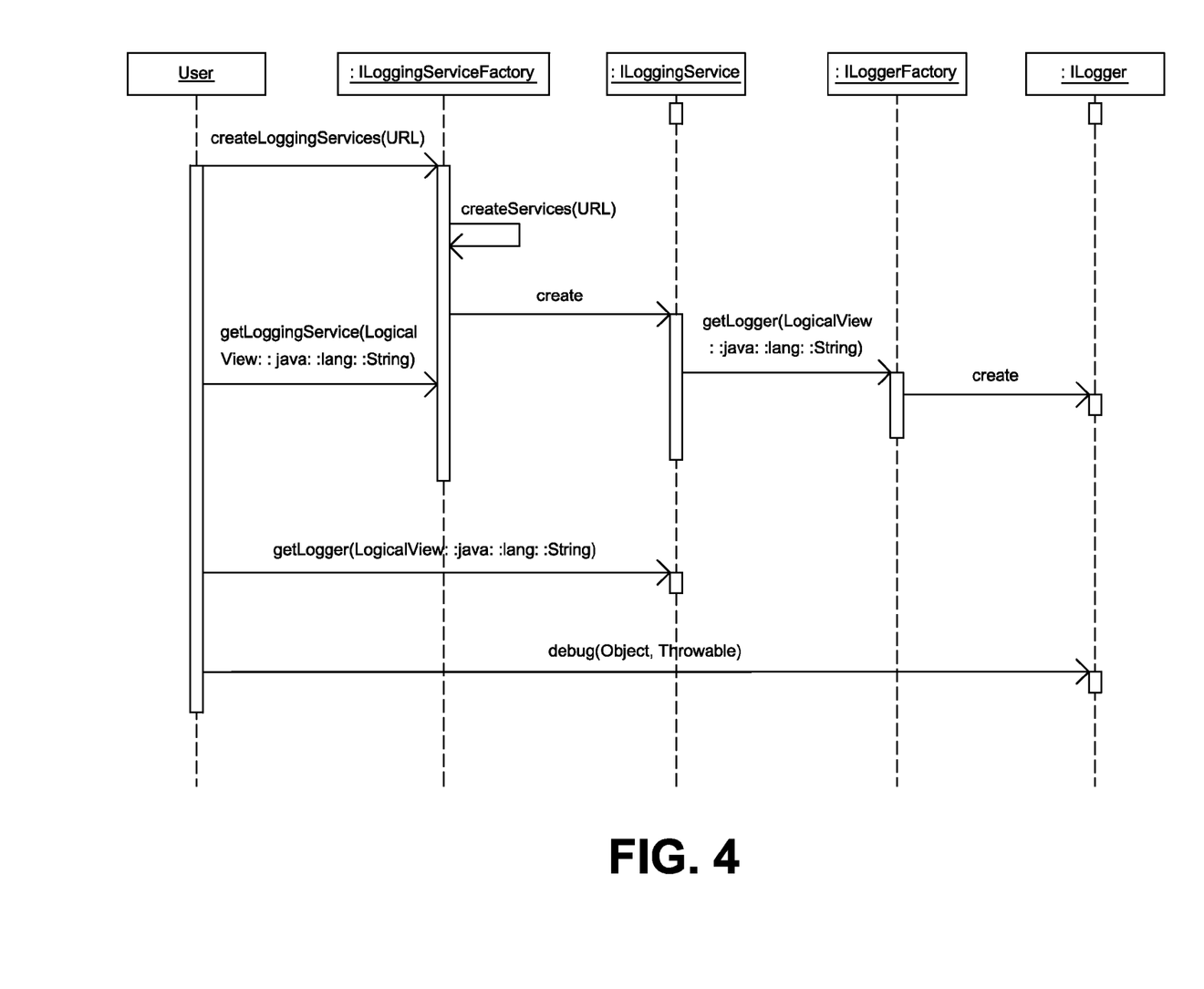
FIG. 4 illustrates an exemplary service interface diagram.

The logging service is invoked from the application via Common Invocation Framework as generally illustrated in FIG. 4. With reference to FIG. 4, the client invokes an infrastructure service via the common Service Locator. This Locator lies in the service broker facilitating a synchronous and asynchronous invocation of services. It also has a temporary storage (caching) of the service thereby reducing round-trips for repeated requests. Expediently, the services are designed as per standard design patterns and obtained from a factory.

Figure 5:
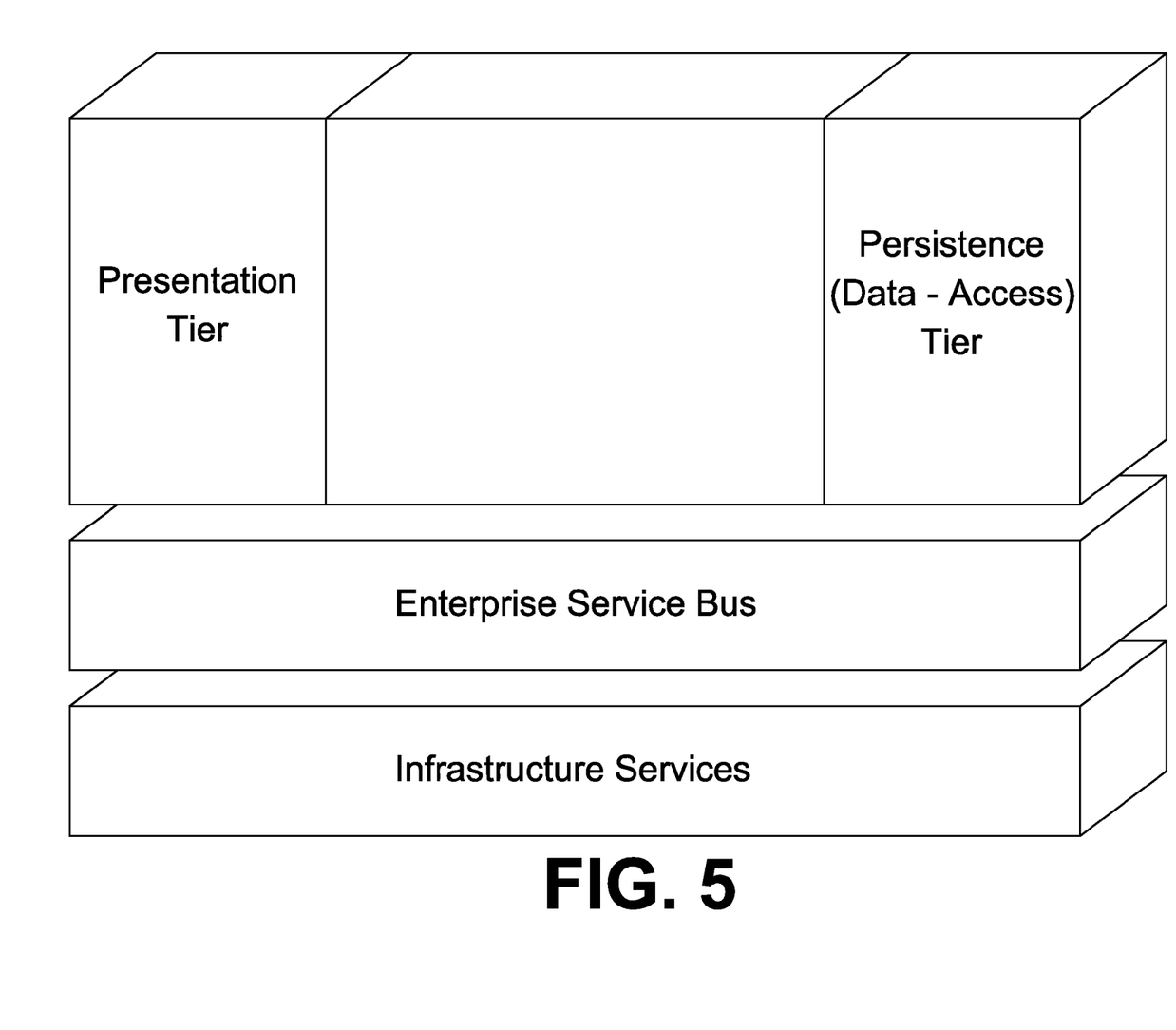
FIG. 5 illustrates a pictorial view of the interaction of the three tiers, i.e., presentation tier, business tier and persistence (data access) tier, with the enterprise service bus and the infrastructure services.

FIG. 5 illustrates a pictorial view of the interaction of the three tiers, i.e., presentation tier, business tier and persistence (data access) tier, with the enterprise service bus and the infrastructure services. The specific interconnections and the broad modular units corresponding to the elements in FIG. 5 may be viewed in FIG. 1 also.

Some of the modules used in the present Prescriptive Architecture may be bought off the shelf and utilized. The components used by an infrastructure service can be bought commercially and implemented in the exemplary Prescriptive Architecture embodiment. For example, IBM® provides an Off-The-Shelf logging component known as JRas® which can be invoked by the e-Enabler framework logging service. The application on an IBM® environment selects the generic logging service of e-Enabler framework to log application messages and the service in turn uses the JRas logging component via pre-configured settings. Certain platforms, in connection with which the present prescriptive architecture may be used, are indicated as examples in the foregoing description. It is noted that the present prescriptive architecture may be used in other platforms also without any limitation. Certain modules and off-the-shelf components are indicated as examples for use in the foregoing description of the prescriptive architecture. Other commercially available or tailored modules or components may be used instead, and, one skilled in the art would be able make suitable design choices to fulfill the necessary function.

In the foregoing detailed description of embodiments of the invention, various features might be seen grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus, the following claims are hereby incorporated into the detailed description of embodiments of the invention, with each claim standing on its own as a separate embodiment. It is understood that the above description is intended to be illustrative, and not restrictive. The description is intended to cover all alternatives, modifications and equivalents as may be included within the spirit and scope of the invention as defined in the appended claims. Many other embodiments will be apparent to those of skill in the art upon reviewing the above description. The scope of the invention should therefore be determined with reference to the appended claims, along with the full scope of equivalents to which such claims are entitled.

The invention claimed is:

1. A prescriptive modular service oriented architecture (SOA) to obtain reusable services in a computing system, said reusable services being composed into service oriented multiple processes and composite solutions on web-application, said prescriptive SOA comprising:
 a plurality of tiers in the computing system selectively including a client tier; a presentation tier; a business logic tier; an integration tier; and a data tier; and
 an infrastructure service layer in the computing system designed across and interacting with said plurality of tiers, wherein the infrastructure service layer is configured to provide configurable services reusable by all said plurality of tiers by invoking them through a common invocation framework (CIF), wherein the configurable services include multiple implementations of the reusable services, and wherein the CIF facilitates dynamic discovery of an implementation of a reusable service from the configurable services registered on a registry in the infrastructure service layer and dynamically invokes, a discovered implementation of the reusable service upon receiving a request, through a service broker; wherein said data tier includes persistence logic to interact with underlying data stores, and data models representing data entities as objects, and a data access layer which encapsulates details connecting data models to the data stores; the integration tier is configured to provide services needed for providing interfacing with external systems; and the presentation tier is configured to implement data validations, to maintain a conversational state, and to provide infrastructure capabilities including caching viewable information, authenticating and authorizing users.

2. The prescriptive modular SOA as in claim 1, including a logging infrastructure service using logging components comprising: a functional interface, a management interface and a factory interface.

3. The prescriptive modular SOA as in claim 2 wherein the logging components have multiple implementations including Apache™ Log4j based implementations and Java™ development kit (Jdk) 1.4 logging based implementations.

4. The prescriptive modular SOA as in claim 1, wherein the client layer includes components required by the user to interact with the web-application.

5. The prescriptive modular SOA as in claim 1, wherein the presentation layer comprises the following design patterns: model-view controller, front controller, business delegate, intercepting filter and service locator.

6. The prescriptive modular SOA as in claim 1, wherein the business logic layer comprises a business process layer and application services layer.

7. The prescriptive modular SOA as in claim 6, wherein the business process layer is configured to implement a session façade design pattern in order to coordinate operations between multiple process objects.

8. The prescriptive modular SOA as in claim as in claim 6, wherein the application services layer is configured to provide a well defined application-specific discrete function that can exist independently, and consist of logic pertaining to each of different functional steps that constitute said business process.

9. The prescriptive modular SOA as in claim 1, wherein the data tier is configured to use DAO design pattern to abstract and encapsulate data access mechanisms.

10. The prescriptive modular SOA as in claim 1, including Java™ EE Connector Architecture (JCA) adapters and message oriented middleware to interface with external systems.

11. The prescriptive modular SOA as in claim 1, wherein the infrastructure service layer is configured to provide configurable services including:
 Security Service including Authentication service and Authorization service;
 Logging Service;
 Notification service;
 Caching Service;
 Administration Service;
 Printing Service;
 Reporting Service;
 Business Rule Service;
 Internationalization Service;
 User-Messaging Service; and
 Metrics Service.

12. The prescriptive modular SOA as in claim 1, including a UI (User Interface) which provides a user access and use of internet, configured to support browsers from multiple vendors and multiple versions of the browsers.

13. The prescriptive modular SOA as in claim 1, wherein the business logic tier is configured to:
 provide management of business requests delegated from the presentation tier,
 capture business processes of said system,
 orchestrate functionalities of said business process, and,
 utilize infrastructure capabilities including logging of business rules.

14. The prescriptive modular SOA as in claim 1, wherein said integration tier is configured to:
 interface with enterprise information systems on real time basis,
 interface with existing third party systems,
 be able to handle different types of interfaces and multiple transport protocols,
 provide easily configurable routing of messages across systems, and,
 provide additional message transformation services including compression, filtering and reforming.

15. The prescriptive modular SOA as in claim 1, configured to:
 provide security and control access to functionality, based on permissions,
 be able to control access to users based on any data that a user is trying to access,
 maintain information on who made changes on important data, and,
 ensure confidentiality of sensitive data including passwords during transmission.

16. The prescriptive modular SOA as in claim 1 wherein the system is designed to maintain integrity of data at all times.

17. The prescriptive modular SOA as in claim 1 wherein the system is able to support users from multiple geographical locations, and wherein the system is scalable.

18. The prescriptive modular SOA as in claim 1, wherein the system is manageable using standard enterprise management system including commercially available tools.

19. The method of claim 1, wherein the request for the configurable services is received from varied client interfaces having different protocols.

20. The method of claim 19 further comprising converting the requests received from the varied client interfaces having different protocols a request having a generic protocol.

21. A software for prescriptive modular service oriented architecture (SOA) to provide on-demand services in a reusable manner for a user through web-access, said services being composed into multiple processes and composite solutions, comprising the steps of:

the user entering user requirements into an user interface in a computing system as a web request input to result in deciding an action-class;

the action class creating a business request and delegating it to a business logic tier in the computing system;

using a business logic controller in the computing system to manage request processing, and passing on control to a business process function in the computing system;

using the business process function by orchestrating several functionalities by interaction selectively with databases, data access components and external systems using integration services in the computing system; and, using infrastructure services in the computing system to enable and complete user requirements, wherein the infrastructure services include multiple implementations of the infrastructure services, wherein a common invocation framework (CIF) in the computing system is invoked to complete user requirements, and wherein the CIF enables dynamic discovery of an implementation of an infrastructure service from the infrastructure services registered on a registry and dynamically invokes, a discovered implementation of the infrastructure service upon receiving the user requirements, through a service broker wherein said data tier includes persistence logic to interact with underlying data stores, and data models representing data entities as objects, and a data access layer which encapsulates details connecting data models to the data stores; the integration tier is configured to provide services needed for providing interfacing with external systems; and the presentation tier is configured to implement data validations, to maintain a conversational state, and to provide infrastructure capabilities including caching viewable information, authenticating and authorizing users.

\* \* \* \* \*

UNITED STATES PATENT AND TRADEMARK OFFICE
CERTIFICATE OF CORRECTION

| | | |
|---|---|---|
| PATENT NO. | : 7,823,125 B2 | Page 1 of 1 |
| APPLICATION NO. | : 11/467176 | |
| DATED | : October 26, 2010 | |
| INVENTOR(S) | : Ritwik Batabyal | |

It is certified that error appears in the above-identified patent and that said Letters Patent is hereby corrected as shown below:

In Claims:

In claim 18, line 67, column 10 change "tools" to --components--

In claim 21, line 12, column 12 after broker insert -- ; --

Signed and Sealed this
Fifteenth Day of February, 2011

David J. Kappos
*Director of the United States Patent and Trademark Office*